United States Patent

[11] 3,565,056

[72] Inventor Louis D. Statham
 Los Angeles County, Calif.
[21] Appl. No. 709,422
[22] Filed Feb. 29, 1968
[45] Patented Feb. 23, 1971
[73] Assignee Statham Instruments, Inc.
 Los Angeles, Calif.

[54] BODY FLUID PRESSURE MEASURING APPARATUS
 7 Claims, 6 Drawing Figs.
[52] U.S. Cl. .................................................. 128/2, 338/4
[51] Int. Cl. .................................................. A61b 5/02
[50] Field of Search ............................................ 128/2, 2.05; 338/4

[56] References Cited
UNITED STATES PATENTS
2,535,998 12/1950 Bierman .................. 73/389

Primary Examiner—Charles F. Rosenbaum
Assistant Examiner—G. F. Dunne
Attorneys—Philip Subkow, George J. Netter and Kendrick and Subkow ABSTRACT: A needle or catheter is received within a region of the body at which fluid pressure is to be measured. At its external end, the needle/catheter is connected to a chamber which also includes a strain-gage sensor. A saline solution is supplied to the chamber and internal parts of the needle/catheter during pressure measurement via a conduit passing through parts of the strain-gage sensor assembly. The conduit terminates at a special orifice and channel on the surface wall of the sensor assembly to provide a perfusing of the chamber and inner parts of the needle/catheter at a very slow rate and with negligible back pressure.

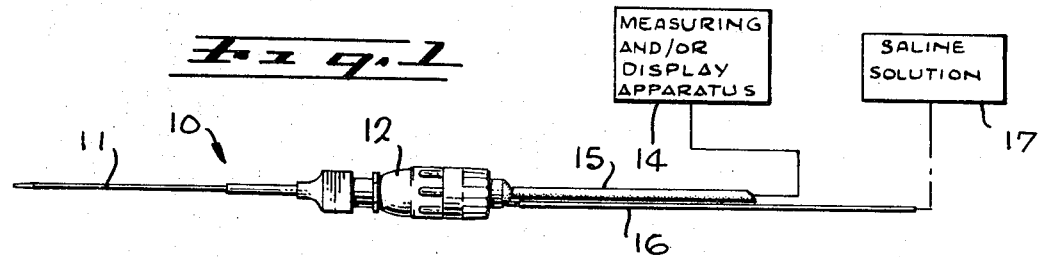
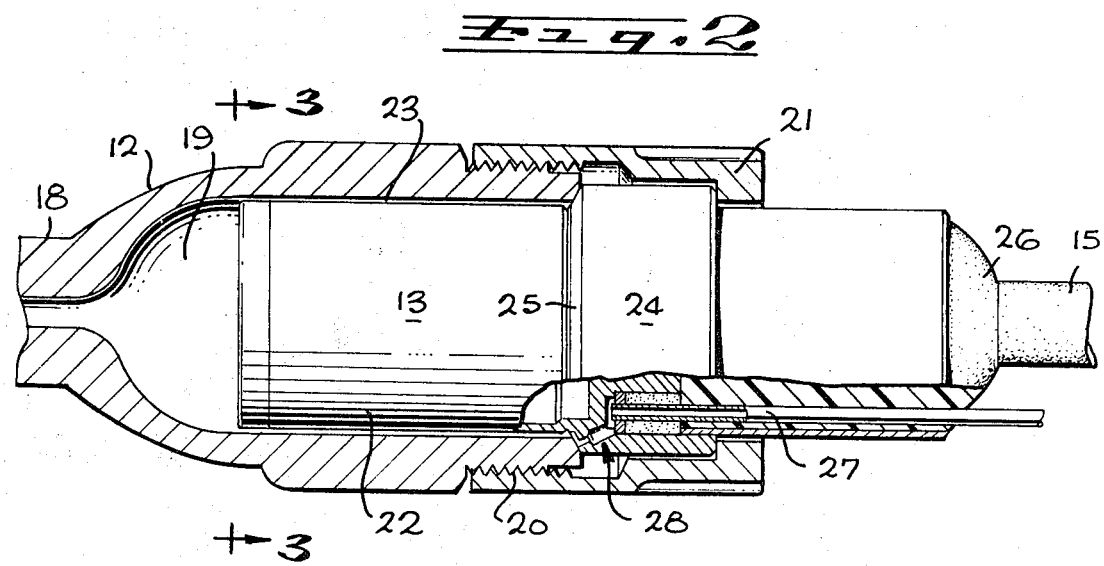
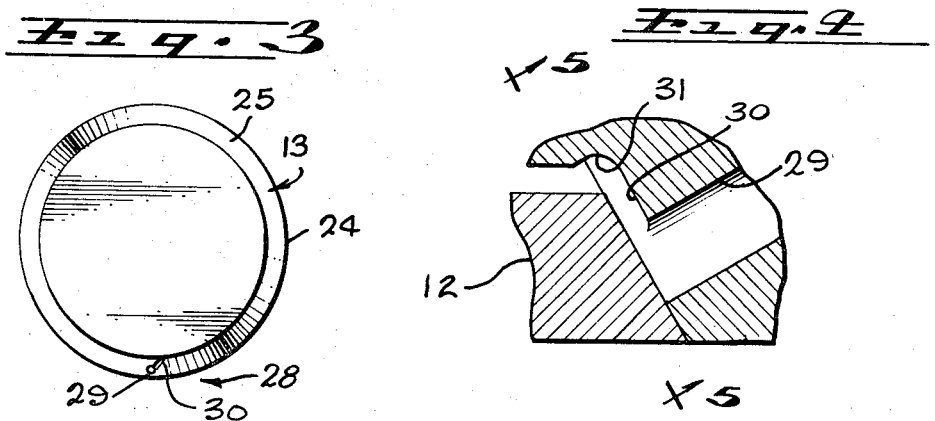
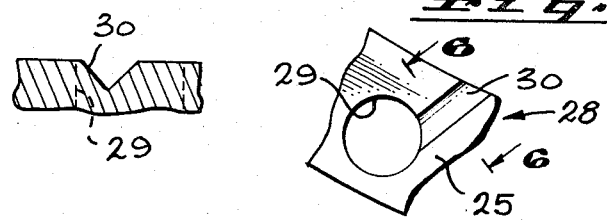

BODY FLUID PRESSURE MEASURING APPARATUS

The present invention relates generally to body fluid measuring apparatus, and, more particularly, to an improved fluid pressure probe assembly for use with such apparatus.

BACKGROUND OF THE INVENTION

For various research and diagnostic purposes, it is desirable to be able to determine the body fluid pressures, e.g., blood and spinal fluid, of an individual to within a high degree of accuracy and to take such pressure measurements at different localized regions of the body and over extended periods of time. Apparatus for measuring blood pressure, for example, has in the past taken a number of different forms, depending upon the accuracy requirements involved, as well as certain other factors. In the usual case where blood pressure of an individual is taken by a physician at his office, the device used for taking such measurements is a sphygmomanometer. However, such apparatus is not sufficiently accurate for many purposes, nor is it capable of determining blood pressure within a particular artery or vein, the latter information being especially helpful for diagnosing certain types of cardiovascular malfunctioning.

One form of known apparatus for measuring blood pressure at a particular locality is that in which a cannula is inserted into a selected blood vessel at the region where blood pressure is desired to be taken. This approach has historically required skilled surgical cutdown of an artery, for example, for insertion of the cannula.

Changes in blood pressure are applied to a bridge circuit of strain-gages thereby producing an electric signal functionally related to the blood pressure in the region immediately adjacent the probe. It is particularly with respect to this needle/catheter probe type of pressure measuring apparatus that the present invention pertains.

In the past, such pressure measuring apparatus have not been found to be completely satisfactory in that problems were encountered with the blood coagulating in the needle or other inner recesses of the probe, particularly where pressure measurements were take over a relatively long period of time. For this reason, the interior of the catheter and probe assembly including the pressure transducer was filled with physiological saline solution. It is important that the saline solution develop a very slight back pressure, just enough to prevent blood entering the probe assembly, but not such a back pressure as to degrade either measurements of blood pressure or the associated measurement of the frequency of pressure changes. It is clear that even minor errors in the sensed frequency of the blood pressure change as well as errors in the actual pressure read can be misleading to the diagnostician or a researcher, and possibly with serious consequences for the patient. In one way or another, prior art devices and apparatus of this character were not completely satisfactory.

It is, therefore, a primary object of the present invention to provide an improved body fluid pressure probe assembly having parts for percutaneous insertion into body regions where pressure measurements are desired to be taken.

Another object of the invention is the provision of a body fluid pressure measuring probe assembly, the internal portions of which are provided with saline solution at a sufficiently low rate and pressure as not to significantly degrade pressure readings taken by pressure transducing apparatus, nor its frequency responses.

Other objects and advantages of the invention will be manifest to those skilled in the art upon reference to the following description, when considered with the accompanying drawings.

SUMMARY OF THE INVENTION

A catheter for being received or implanted within a blood vessel terminates at its outer end in a hollow, transparent, domelike chamber. A strain-gage pressure sensing means is enclosed within the chamber and includes portions extending outwardly of the chamber through which electrical connectors pass to an external cable for ultimate connection to remotely located display and measuring apparatus. The external portions of the pressure sensing means also include a conduit by which saline solution is transmitted to the interior of the dome chamber and the catheter during use. The conduit terminates at the interior of the dome chamber at an orifice and connecting microchannel formed in a wall surface of the pressure sensing means. In assembled condition, only the microchannel openly communicates with the dome chamber, thereby providing steady admission of saline solution to the interior of the probe assembly at an extremely low rate and low back pressure.

BRIEF DESCRIPTION OF THE DRAWING

FIG. 1 is an overall view of the probe assembly of the invention and associated connective cabling.

FIG. 2 is an enlarged sectional view of FIG. 1.

FIG. 3 is a sectional view taken along line 3—3 of FIG. 2.

FIG. 4 is a greatly enlarged, fragmentary view of a portion of the probe assembly of FIGS. 2 and 3, showing the detailed structure of the saline solution inlet means to the probe interior.

FIG. 5 is a side elevational view of the inlet means of FIG. 4 taken looking directly into the inlet means.

FIG. 6 is a sectional view taken along the line 6—6 of FIG. 5.

DESCRIPTION OF A PREFERRED EMBODIMENT

Although the apparatus described herein can be advantageously used for measuring various body fluids, e.g., blood in blood vessels, spinal fluid, and fluids in tissues, it will be described particularly in connection with measurement of blood pressure with an artery or vein, for ease of presentation.

With reference now particularly to FIG. 1, the pressure probe assembly of the present invention, illustrated generally as at 10, is seen to include in its major structural elements a catheter 11 for insertion into an artery or vein in the region where it is desired to determine blood pressure. The catheter 11 is mounted onto a hollow domelike chamber 12, the latter also enclosing a pressure transducer 13. The transducer is connected to remotely located measuring and/or display apparatus 14 of conventional construction, via cabling 15. A flexible conduit or tubing 16 interconnects a supply of pressurized saline solution 17 to the interior of the domelike chamber 12 in a manner that will be more particularly described later herein.

Turning now to FIG. 2, the catheter is received onto an appropriately dimensioned protruding wall portion 18 of the chamber 12 in a tightly fitting and fluid sealed relation, providing through communication of the catheter interior with the chamber interior 19. The major part of the chamber 12 is generally cylindrical (FIG. 3) and open-ended with its cross section diameter being several times that of the protruding portion 18. The outer end margin of the chamber wall is formed into threads 20 for cooperating with similar threads on the interior of a caplike retaining sleeve 21. Although a number of materials may be found suitable from which to construct the domelike chamber 12, best results have been obtained to date with a transparent thermoplastic, such as polyvinyl butyral.

As seen best in FIG. 2, the pressure transducer 13 includes a generally cylindrically shaped enclosure 22 within which the transducer is carried, which portion has its cross-sectional dimension slightly less than the bore of the chamber 12 within which it is received such that when mounted within the chamber, an annular space 23 is provided therebetween. A base portion 24 of cross-sectional diameter significantly larger than the major bore of the chamber 12 is integrally connected to the portion 22 by a beveled shoulder or connecting wall 25. An externally extending body of encapsulant 26 is secured to the base portion 24 and through which pass electrical connectors relating the pressure transducer 13 to the cabling 15.

Also, a conduit 27 passes longitudinally through the encapsulant body 26 to connect at the exterior to the tubing 16 and terminates internally at a special orifice means 28 in the beveled shoulder 25.

As shown in FIG. 3, and again greatly enlarged in FIG. 5, the orifice means 28 comprises a circular opening 29 in the connecting wall 25 that communicates with the conduit 27, and an open channel 30. More particularly, the channel 30 is formed in the surface of the wall 25 and extends from the opening 29 to a curved depression 31 lying just below the outer wall surface of the cylindrical portion 22 to communicate with the space 23.

When assembled, the open end wall surface of the chamber 12 engages the surface of the beveled connecting wall 25 thereby covering the opening 29 and a portion of the channel 30 immediately adjacent the opening (FIG. 4). Saline solution made available via the conduit 27 can, therefore, only make its way into the space 23, and other interior parts of the probe assembly, by passing through the restricted passageway formed by the channel 30 and the end wall of the chamber 12. It is an important feature of this invention to provide a "choke" or reduced exit orifice means for the saline to reduce the pressure at the catheter to just above the maximum pressure to be sensed. That is, the fluid is introduced under a flow pressure, usually a hydrostatic head, and flows through the conduit 27 until it reaches the orifice means 28 where it experiences a sharp drop in pressure and makes its way to the space 23 via the channel 30 at a pressure considerably below that in the conduit 27.

To illustrate the relative dimensions of the different structures comprising the orifice means 28, in an actual construction of a preferred form of the invention, the transducer cylindrical portion 22 has a sectional diameter of approximately one-fourth inch and the shoulder 24, a diameter of about three-tenths inch. The opening 29 in the connecting wall is 0.011 inch and the channel 30 is a V-groove 0.004 inch wide and approximately 0.003 inch deep. The depression 31 has a radius of 0.002/0.004 inch and a depth of 0.003/0.005 inch. Saline flow to the dome chamber can be maintained at as low a rate as a few drops per minute.

Although the supply 17 has been indicated generally in the preceding description merely as saline solution, it is important that the solution be of a very precise concentration in order not to produce adverse effects upon being injected into the blood stream. Satisfactory solutions for present purposes must be essentially isotonic with tissue fluids or blood, such as, for example, an 0.85 percent solution by weight of NaCl in water. Moreover, the saline solution pressure is just slightly in excess of the blood pressure so that a very slight movement of the solution through the probe assembly into the blood occurs.

No details of the transducer 13 construction have been shown since the particular kind of transducer used is not basic to the present invention. The primary requirements of a satisfactory pressure transducer for present purposes are that it can be enclosed in a cylindrical structure as 22 and operable from pressures applied against an end diaphragm 32 thereof. Satisfactory transducers of the strain-gage type for use in this connection are disclosed in U.S. Pat. Nos. 2,573,236; 2,958,056 and 3,058,348.

In operation, the saline solution is introduced into the domelike chamber 12 and catheter or needle via the tubing 16, flushing out all air from the interior of the probe assembly. The catheter or needle can now be inserted into a preselected vein or artery with all risk of air embolism eliminated. Changes in pressure of the blood are transmitted through the saline solution to the pressure transducer 13 where they are converted to corresponding electric signals for measurement and/or display on the apparatus 14. Since the saline solution is isotonic with the blood, pressure changes are transmitted to the transducer substantially undiminished. Also, the saline solution tends to eliminate stoppage due to coagulation of the blood in the region of the catheter or needle cavity both by diluting the blood and because of the solution flow toward the blood preventing accumulation of the blood in the restricted areas. Still further, since little, if any, blood gets into the interior of the probe assembly described here, a later difficult cleaning problem is obviated.

There is, therefore, provided in accordance with the practice of the present invention, blood pressure measuring apparatus of the implantable type, an important feature of which is the provision of a unique automatic physiological saline flow rate control means maintaining the interior of the probe assembly parts filled at all times with saline. However, the saline is added at such a slow rate, and by such minute volume additions, that pressure change due to the addition of the saline is negligible. The probe assembly provides clear visibility, and, by virtue of its facility for bubble ejection, insures against the creation of an embolism from an air bubble accidentally being inserted into the blood stream during the taking of a pressure measurement.

Of particular advantage is location of the orifice means 28 remotely from the operative surface or diaphragm of the pressure transducer. This relative isolation of the transducer from a possible source of error further enhances the accuracy of measurement achieved by the probe assembly of this invention.

Accuracy achieved by percutaneous blood pressure measurements with the described probe assembly are comparable to that obtained by large-diameter catheter systems, and with greatly simplified surgical aspects thereby reducing dangers of surgical trauma.

A further aspect of the present invention is that the particular construction of the orifice means 28 is such as not only to accomplish the desired pressure reduction and provide low flow rate of saline to the probe interior, but also when the probe assembly is taken apart, the various parts may be easily and quickly cleaned and sterilized for later use. The conduit 27 and opening 29 are relatively large, permitting the admission of pressurized materials for cleaning and sterilizing the interior parts thereof. Also, the channel 30, since it lies on an open surface is easily cleaned and sterilized, although of minute dimensions. This is very important since even a very small amount of impurities on the interior of the probe assembly, on being injected into a patient's blood stream could be dangerous, if not fatal.

Although advantageous results are obtained by locating the saline orifice means remotely from the transducer diaphragm, other locations of the orifice means may provide satisfactory results. For example, it is contemplated that the orifice means could be located somewhat closer to the transducer diaphragm than in the described embodiment, and still produce a sufficiently low rate of perfusion of the dome chamber that the possibility of adverse effect on readings or measurements made by the transducer is still overcome. In fact, with a saline supply rate to the chamber of but a few drops per minute, the orifice means may be disposed immediately adjacent the pressure sensing surfaces of the transducer and still accomplish the desired flushing action without degrading the quality of pressure measurements made or the sensed frequency of pressure changes.

Although but a single embodiment of the present invention has been shown and described, it will be obvious to one skilled in the art that changes and modifications may be made without departing from the spirit of this invention in its broader aspects, and, therefore, the aim in the appended claims is to cover all such changes and modifications as fall within the true spirit and scope of this invention.

I claim:

1. Body fluid pressure measuring apparatus, comprising:
    a catheter, one end of which is received within a region of the body at which fluid pressure is to be measured;
    a chamber connected to the free end of the catheter, the interior of which chamber is in open communication with the catheter interior;
    pressure transducing means mounted within the chamber and having portions extending outwardly therefrom; and conduiting means carried by the pressure transducing means in continuous open communication between a pressurized source of a fluid medium and the chamber interior, in which the the pressure transducing means is mounted through an opening in walls defining the chamber, said transducing means including portions for engaging the chamber walls and sealing the chamber opening through which the transducing means is mounted; said conduiting means terminating at the chamber interior in an orifice and communicating groove formed by the cooperative action of the transducing means and chamber wall.

2. Body fluid pressure measuring apparatus as in claim 1, in which the orifice is covered by the walls defining the chamber opening and the rate of fluid medium flow into the chamber interior is dependent upon the groove cross-sectional dimensions.

3. Body fluid pressure measuring apparatus as in claim 1, in which pressure responsive portions of the transducing means are remotely located from and at such an angle to the orifice and communicating groove that the incoming fluid medium impinges on parts of the transducing means other than the pressure responsive portions.

4. In fluid pressure measuring apparatus having a catheter, one end of which is disposed in the fluid being measured, a pressure transducer, a chamber including pressure responsive parts of the transducer therewithin and connected to the other end of the catheter in fluid passing relation, means supporting the transducer to a chamber wall, a supply of physiological saline completely filling the chamber and catheter, the improvement comprising:
a conduit passing through the supporting means providing continuous communication between the chamber interior and a supply of pressurized physiological saline; and
walls defining an opening means at the inner end of the conduit of reduced flow rate capacity relative to that of the conduit whereby physiological saline is added to the filled chamber at a rate and in a manner producing negligible effect on the pressure responsive parts of the transducer.

5. In fluid pressure measuring apparatus as in claim 4, in which the opening means is so located relative to the transducer that fluid emitted from said opening means moves over and past other parts of said transducer before reaching the pressure responsive parts thereof.

6. In fluid pressure measuring apparatus as in claim 4, in which there are further provided releasable means for securing the transducer supporting means to a wall of said chamber, a portion of said wall against which the supporting means is secured covering a part of said opening means thereby deflecting flow of the saline to the chamber interior.

7. Body fluid pressure measuring apparatus, comprising:
a catheter, one end of which is received within a region of the body at which fluid pressure is to be measured;
a chamber connected to the free end of the catheter, the interior of which chamber is in open communication with the catheter interior;
pressure transducing means mounted within the chamber and having portions extending outwardly therefrom, said transducing means including a generally cylindrical enclosure extending into the chamber and a shoulder of enlarged diametral measurements, said shoulder abutting against the chamber walls in such manner as to maintain a spaced condition of the cylindrical enclosure from the opposed chamber walls; and
conduiting means carried by the pressure transducing means for conducting a fluid medium to the chamber interior, said conduiting means passing completely through the shoulder from the outside to terminate at an orifice opening into the space between the chamber wall and the cylindrical enclosure.